(12) United States Patent
Read et al.

(10) Patent No.: US 7,664,364 B2
(45) Date of Patent: Feb. 16, 2010

(54) WAVEGUIDE ASSEMBLY AND CONNECTOR

(75) Inventors: Ian James Read, Bristol (GB); Gareth Leslie Bannister, St. Leonards on Sea East Sussex (GB)

(73) Assignee: Deutsch UK, East Sussex (GB)

( * ) Notice: Subject to any disclaimer, the term of this patent is extended or adjusted under 35 U.S.C. 154(b) by 0 days.

(21) Appl. No.: 11/568,151

(22) PCT Filed: Apr. 20, 2005

(86) PCT No.: PCT/GB2005/050054

§ 371 (c)(1),
(2), (4) Date: Oct. 20, 2006

(87) PCT Pub. No.: WO2005/103786

PCT Pub. Date: Nov. 3, 2005

(65) Prior Publication Data

US 2007/0201808 A1 Aug. 30, 2007

(30) Foreign Application Priority Data

Apr. 20, 2004 (EP) .................................. 04252309
Apr. 20, 2004 (GB) .................................. 0408762.3

(51) Int. Cl.
*G02B 6/00* (2006.01)

(52) U.S. Cl. ...................................... 385/147; 385/138

(58) Field of Classification Search ................ 385/138, 385/147, 136, 139
See application file for complete search history.

(56) References Cited

U.S. PATENT DOCUMENTS

| | | | | |
|---|---|---|---|---|
| 5,355,429 A * | 10/1994 | Lee et al. | ..................... | 385/136 |
| 6,173,090 B1 * | 1/2001 | Simon et al. | ................... | 385/12 |
| 6,628,860 B1 * | 9/2003 | Van Doorn | ................... | 385/31 |
| 7,178,994 B2 * | 2/2007 | Tourne | ....................... | 385/89 |
| 7,364,366 B2 * | 4/2008 | Tourne | ....................... | 385/69 |
| 2004/0008964 A1 * | 1/2004 | Tourne | ....................... | 385/136 |

* cited by examiner

*Primary Examiner*—Ellen Kim
(74) *Attorney, Agent, or Firm*—Renner, Otto, Boisselle & Sklar, LLP

(57) ABSTRACT

One aspect of the invention relates to a waveguide assembly. The waveguide assembly comprises a waveguide (120) provided on a substrate (126), a waveguide housing (100) and an embedding layer (138) embedding at 5 least part of the waveguide housing (100). The waveguide housing (100) comprises a waveguide channel (102) for guiding the waveguide (120) from the substrate (126) through the embedding layer (138).

26 Claims, 8 Drawing Sheets

WAVEGUIDE ASSEMBLY AND CONNECTOR

This application is a national phase of International Application No. PCT/GB2005/050054 filed Apr. 20, 2005 and published in the English language.

FIELD

The present invention relates to waveguide assemblies and connectors. In particular, but not exclusively, it relates to waveguide assemblies and connectors for providing an interface from an embedded waveguide to a cooperating module located, for example, at the surface of a panel for forming part of an aircraft or other vehicle structure.

BACKGROUND

The provision of embedded waveguide structures to provide embedded sensing and/or embedded communications channels provides various known benefits. Where such waveguide structures are provided integrally within, for example, an aircraft, relatively light materials, such as, for example, optical fibres (fibre optics) may be provided, which are not only lighter than traditional metal wiring, but also relatively noise-immune and inexpensive.

While it is desirable to embed waveguide structures within panels that form a larger structure, such as, for example, a building or aircraft it has proved to be reasonably difficult and time consuming to provide reliable connections to such embedded waveguide structures, particularly during the process of manufacturing the larger structure.

Conventionally, to produce a panel, such as a composite panel for an aircraft incorporating an embedded waveguide, a waveguide (such as, for example, a fibre optic) is embedded in the composite panel and emerges from an edge of the panel from where it is terminated into a connector. However, not only are such so-called "edge connectors" labour intensive to produce, but they also place substantial limitations upon any subsequent modification to the panels. This in turn means that it has been necessary to provide a range of different panels in different shapes and sizes to assemble into the larger structure. This not only increased the tooling costs and complexity involved in producing a complex larger structure, but also gave rise to a requirement for intensive use of skilled labour capable of making the edge connectors.

In order to address the problems associated with panels using edge connectors, and in particular in order to provide a panel that could be shaped after manufacture to allow, for example, for the removal of peripheral defects, the Applicants have previously devised various ways of interfacing to embedded waveguides. Various methods are discussed further in the present Applicant's patent applications EP-A1-1,150,145 and EP-A1-1,150,150, the contents of which are hereby incorporated herein by reference in their entirety.

The aforementioned patent applications describe various ways of interfacing optical fibres, incorporated into components made using composite materials, to surface-mountable interface modules. The optical fibres are accessed from the surface of the components post-manufacture in order to leave the surface of the components free of incisions, cavities and the like during the assembly of various components into a larger structure, such as, for example, an aircraft body.

While embedding of optical fibres and various interfacing components within a substrate, such as a composite material, can facilitate assembly of such a larger structure, since waveguide connections can be made post-assembly, this approach is not without certain drawbacks. Processing of the substrate structure to reveal embedded components with which to interface can be quite difficult and time-consuming. This is partly because the components must first be located and then subsequently exposed. Ease of exposure of components may also be hindered as the substrate structure will already be part of the larger structure which may in turn make accessibility an issue when attempting to "dig out" or expose the interface components. Furthermore, the task of exposing the embedded components calls not only for a skilled technician, but also requires the use of specialist equipment.

Another consideration in relation to conventional embedded connector components is that they may need to be non-standard, and thus may require additional manufacturing facilities to produce them. This can increase the relative cost and complexity when compared to standard type waveguide connectors. Moreover, use of such embedded connector components may also result in sub-optimal alignment, finishing, polishing, etc., thereby leading to relatively high insertion and/or coupling losses. For example, certain conventional connectors use tubing to reinforce an exit point of a waveguide from a composite material. Not only does this damage the composite since the fibres must be teased apart, but it is also very labour intensive and therefore sub-optimal for manufacturing.

Additionally it is generally undesirable, post-assembly into a larger structure, to use complex processing of fibre optic components either near to the edges or the centre of the substrate to produce a suitable connector, since this increases the chance of weakening the fibre optics and/or their support structures and also may mean that they become damaged, possibly resulting in a need for their subsequent removal and replacement. Moreover, waveguide connectors produced by processing exposed fibre optic components post-assembly cannot be tested until they have been formed, thereby introducing a risk that a panel including a defective connector be included in the larger structure. This could in turn require subsequent remedial attention, like replacement of a section of structure, such as, for example, a full aircraft panel, despite the expenditure of the time and effort to produce the defective connector.

Various techniques relating to the use of fibre optic components and/or embedding of fibre optic components into substrate structures may also be found in the following documents, the teachings of all of which are hereby incorporated herein by reference in their entirety: "Termination and connection methods for optical fibres embedded in aerospace composite components," A. K. Green and E. Shafir, Smart Materials and Structures, Volume 8(2), pp. 269-273 (1999); "Optical fiber sensors for spacecraft applications," E. J. Friebele et al, Smart Materials and Structures, Volume 8(6), pp. 813-838 (1999), which discloses use of a rubber tool attached to the surface of a composite material after it is cured; "Development of fibre optic ingress/egress methods for smart composite structures," H. K. Kang et al, Smart Materials and Structures, Volume 9(2), pp. 149-156 (2000); "Infrastructure development for incorporating fibre-optic sensors in composite materials," A. K. Green et al, Smart Materials and Structures, Volume 9(3), pp. 316-321 (2000); and "Manufacturing technique for embedding detachable fiber-optic connections in aircraft composite components," A. Sjögren, Smart Materials and Structures, Volume 9(6), pp. 855-858 (2000).

The aforementioned considerations and documents have been borne in mind when devising the various aspects and embodiments of the invention, as herein described.

SUMMARY

According to a first aspect of the invention, there is provided a waveguide assembly. The waveguide assembly comprises a waveguide provided on a substrate, a waveguide housing and an embedding layer embedding at least part of the waveguide housing. The waveguide housing comprises a waveguide channel for guiding the waveguide from the substrate through the embedding layer.

The waveguide housing can be used to guide the waveguide to a surface of the embedding layer in such a manner that the waveguide emerges at an angle to the surface that is non-perpendicular thereto. This enables an optical connector to be produced incorporating the waveguide housing that has a lower surface profile than conventional waveguide connectors. By providing lower profile waveguide connectors, waveguide assemblies according to this aspect of the invention can be used, for example, in aircraft or other vehicles where confined spaces may occur. Additionally, lower profile waveguide connectors may be provided where improved aerodynamic efficiency is required.

Furthermore, by providing such a waveguide assembly, a waveguide may be guided to the surface of the embedding layer by the waveguide housing in such a manner that the waveguide is not bent beyond a critical bending radius, thereby providing a waveguide connector that has improved optical properties, such as, for example, lower insertion and/or coupling losses. Also no additional radiation steering components, such as those found in various conventional assemblies, are needed. By using fewer components, not only are manufacturing costs reduced and the manufacturing process simplified, but also a connector having lower losses can be provided.

A further benefit provided by the waveguide assembly is that during the manufacturing process and/or after the manufacturing process the waveguide is protected in the waveguide channel of the waveguide housing, thereby reducing the risk of any damage to the waveguide. Also it is possible to facilitate termination of the waveguide, for example into a standard type connector, thereby reducing the need for complex processing to provide a waveguide connector at the surface of the embedding material.

The waveguide housing may comprise a base portion for stabilising the waveguide housing during a manufacturing process and/or when embedded in the embedding layer. Provision of such a base portion provides for better support and increased stability of the waveguide housing both during and after assembly, thus further reducing the chance of damaging the waveguide. In various embodiments, the embedding layer overlaps at least part of the base portion. This provides a greater area of contact between the embedding layers and the waveguide housing, thereby providing for a stronger fixing.

In various embodiments, the waveguide comprises an optical fibre. The optical fibre may be selected for single and/or multimode operation at various wavelengths, such as, for example, one or more of: UV, visible, near-infrared and infrared wavelengths. The optical fibre may be terminated into a ferrule mounted in the waveguide housing, by, for example, fixing the optical fibre in the ferrule, then cleaving and polishing the optical fibre end. Such a ferrule can form part of a standard optical fibre connector, such as, for example, MC5, HA, FC, FC/PC, etc.

The substrate may, for example, comprise one or more of: a composite material and a metallic material. Conveniently, a waveguide assembly according to the first aspect of the invention may be retrofitted to existing substrate materials, such as, for example, existing aircraft surface panels. Such a retrofit may, for example, be used to add an optical fibre-based stress monitoring system to an existing airframe, thereby permitting the monitoring of the state of the airframe and hence safely prolonging the aircraft's working life.

According to a second aspect of the invention, there is provided a panel for a vehicle fuselage, component, body or hull, comprising the waveguide assembly according to the first aspect of the invention.

The substrate of the waveguide assembly may be used to provide a panel having a connector that is accessible at a surface of the panel. Such panels find use in many applications, such as, for example, for aircraft or motor vehicles. By providing a connector that is accessible at a surface of the panel, various embodiments of the invention provide panels which can be machined post-manufacture, without damaging the panel or waveguide assembly, in order for them to be incorporated into, for example, an aircraft structure or a racing car body. Accordingly, various embodiments of the invention enable the manufacture of larger structures incorporating a waveguide assembly, such as aircraft or other vehicles, to be more efficiently produced.

Furthermore, provision of a waveguide assembly that is accessible at a surface of a panel allows for rapid and easy connection of surface modules which may be interchanged with various other surface modules. For example, a surface module connected to a temperature sensing system may be readily interchanged with a surface module connected to a fibre optic continuity tester so that the integrity of an embedded waveguide used to sense the temperature of a substrate can be verified during a maintenance check.

According to a third aspect of the invention, there is provided a vehicle comprising a panel according to the second aspect of the invention.

According to a fourth aspect of the invention, there is provided a method of manufacturing a vehicle, comprising incorporating the panel according to the second aspect of the invention into a vehicle fuselage, component, body or hull.

According to a fifth aspect of the invention, there is provided a method for retrofitting a waveguide sensing and/or communications system comprising a waveguide assembly to an existing substrate. The method comprises: a) providing a waveguide on the existing substrate; b) providing a waveguide housing that houses a portion of the waveguide proximal to a surface of the existing substrate; and c) embedding at least part of the waveguide housing in an embedding layer so as to affix at least part of the waveguide and at least part of the housing to the existing substrate. In various embodiments, the existing substrate is part of a vehicle fuselage, component, body or hull.

According to a sixth aspect of the invention, there is provided a waveguide housing for use in a waveguide assembly. The waveguide housing comprises a waveguide channel for guiding a waveguide provided on a substrate from the substrate through an embedding layer.

According to a seventh aspect of the invention, there is provided a method of manufacturing a waveguide assembly. The method comprises: providing a portion of a waveguide in a waveguide channel of a waveguide housing; disposing a further portion of the waveguide on a substrate; and embedding at least part of the waveguide housing in an embedding layer. The waveguide housing is configured to guide the waveguide from the substrate through the embedding layer.

The method may also comprise capping the waveguide housing prior to embedding in the embedding layer. By capping the waveguide housing, the waveguide and/or other components of the waveguide assembly can be protected during and/or after the manufacturing process. For example, capping may be used to inhibit the ingress of materials that might be used during the manufacturing process (such as, for example, epoxy resin or components thereof). Provision of a cap can also help when aligning various elements used in the manufacturing process. Tooling may be applied to the waveguide housing to consolidate the substrate and/or the embedding layer.

According to an eighth aspect of the invention, there is provided a method of manufacturing a waveguide connector having a standard type connector. The method comprises manufacturing a waveguide assembly and incorporating the waveguide assembly into the standard type connector.

According to a ninth aspect of the invention, there is provided consolidation tooling for applying pressure to the surface of an embedding layer surrounding a waveguide housing. The consolidation tooling comprises a consolidation base and an attachment mechanism for attaching to a waveguide housing and configured to exert a compressional force between the consolidation base and the waveguide housing. The use of such tooling can provide a waveguide assembly having a better material finish than would otherwise be the case.

BRIEF DESCRIPTION OF THE DRAWINGS

Embodiments of the present invention will now be described, by way of example only, with reference to the accompanying drawings where like numerals refer to like parts and in which.

DETAILED DESCRIPTION OF EMBODIMENTS OF THE INVENTION

Figure 1:
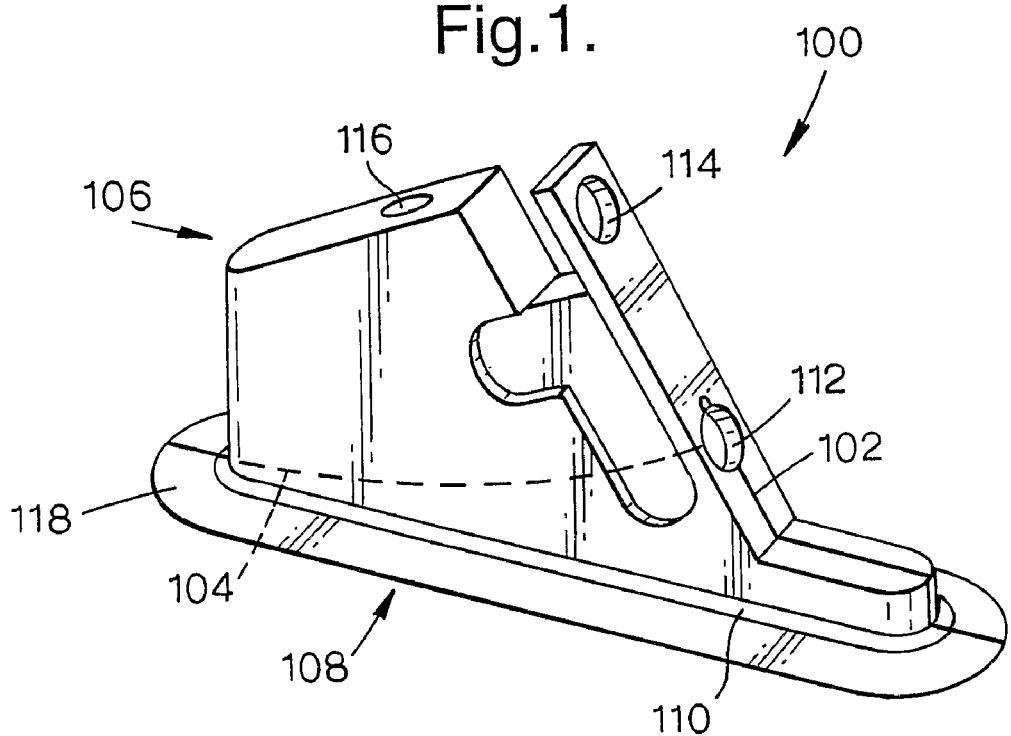
FIG. 1 shows an embodiment of a waveguide housing according to a first embodiment of the present invention.

FIG. 1 shows a first embodiment of a waveguide housing 100. The waveguide housing 100 is made of a single machined stainless steel piece and comprises an upper portion 106 and a base portion 108. A waveguide channel 102 is formed by a machined slot that splits the base portion 108 in two and cuts into the upper portion 106 to form the waveguide path 104. On the upper portion 106, the waveguide channel 102 terminates at a ferrule recess 112. The ferrule recess 112 comprises a recess formation having a diameter and depth sufficient to retain part of a mounting collar housing a standard diameter ceramic ferrule. The waveguide path 104 extends from the base portion 108 to the ferrule recess 112, and provides a curved path for a waveguide (not shown) to follow from the base portion 108 to the ferrule recess 112.

The base portion 108 comprises a circumferential lip 118 and a concave portion 110 formed integrally with the upper portion 106. The circumferential lip 118 is used to stabilise the waveguide housing 100 during incorporation into a waveguide assembly and thereafter once so incorporated. The concave portion 110 provides a suitable surface for consolidation tooling (see FIG. 6, for example) to bear upon during the process of incorporation into a waveguide assembly.

The upper portion additionally comprises a connector recess 114 that may be used for coupling to component parts of a waveguide connector and/or aligning a protective plug/cap etc. The upper portion also comprises a threaded capping attachment recess 116 that is used when attaching protective components over the waveguide housing during subsequent manufacturing stages.

In this embodiment the waveguide housing 100 is made of a single machined stainless steel piece, but it may equally well be made in several pieces, by a variety of methods and/or from a variety of materials. By forming a waveguide housing from a plurality of parts, various types of waveguide, such as, for example, non-optical fibre waveguides, can be incorporated into the housing with comparative ease. Machineable and/or mouldable materials may also be used. This is particularly beneficial where mass production of waveguide housings is desired.

As indicated, various materials may also be used. For example, the waveguide housing may comprise a rigid material, thereby making production of a waveguide assembly easier whilst also providing additional protection for the waveguide. The waveguide housing may comprise an inert material that has a low reactivity with any surrounding material, thereby providing good long-term stability. Suitable materials for waveguide housings include, but are not limited to, one or more of the following materials: a metal/metal alloy; a plastics material; a ceramic material; PEEK and ARCAP.

Figure 2:
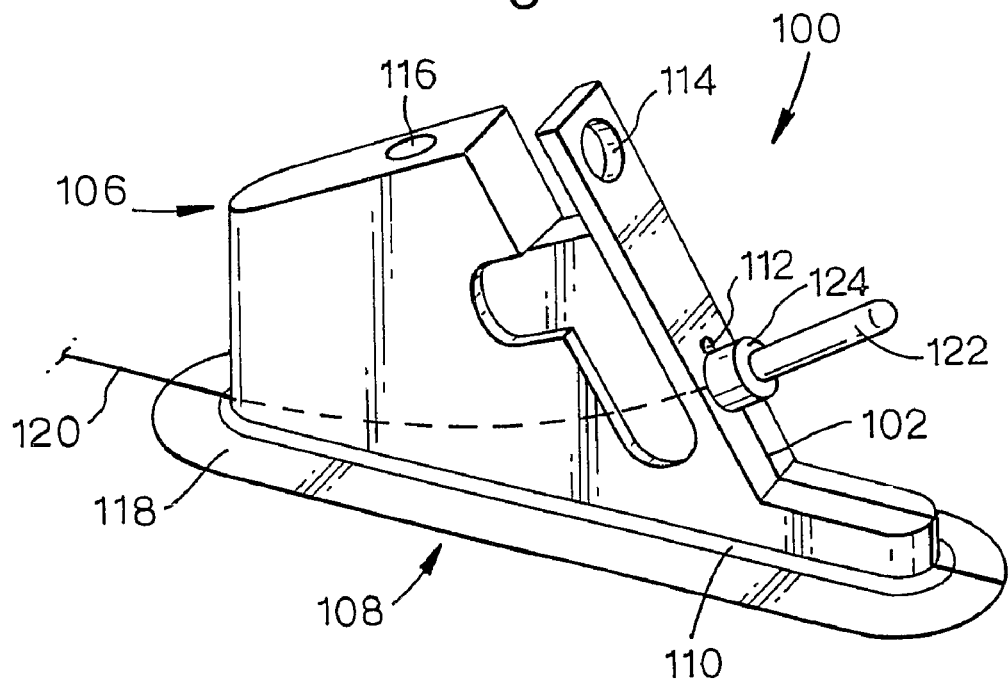
FIG. 2 shows a waveguide mounted in the waveguide housing of FIG. 1.

FIG. 2 shows a waveguide 120 mounted in the waveguide housing 100. The waveguide 120 comprises an optical fibre terminated into a standard 1.25 mm diameter ceramic ferrule 122. The optical fibre is fixed in the ferrule 122, cleaved and then polished using standard techniques. The ferrule 122 is coupled to a mounting collar 124 that is mounted into the ferrule recess 112. By using the waveguide housing 100, the waveguide 120 is guided in the waveguide channel 102 from the base portion 108 along the waveguide path 104 to the ferrule recess 112, where it is terminated into the ferrule 122. The waveguide 120 is potted into the waveguide channel 102 to form a stable arrangement.

Figure 3:
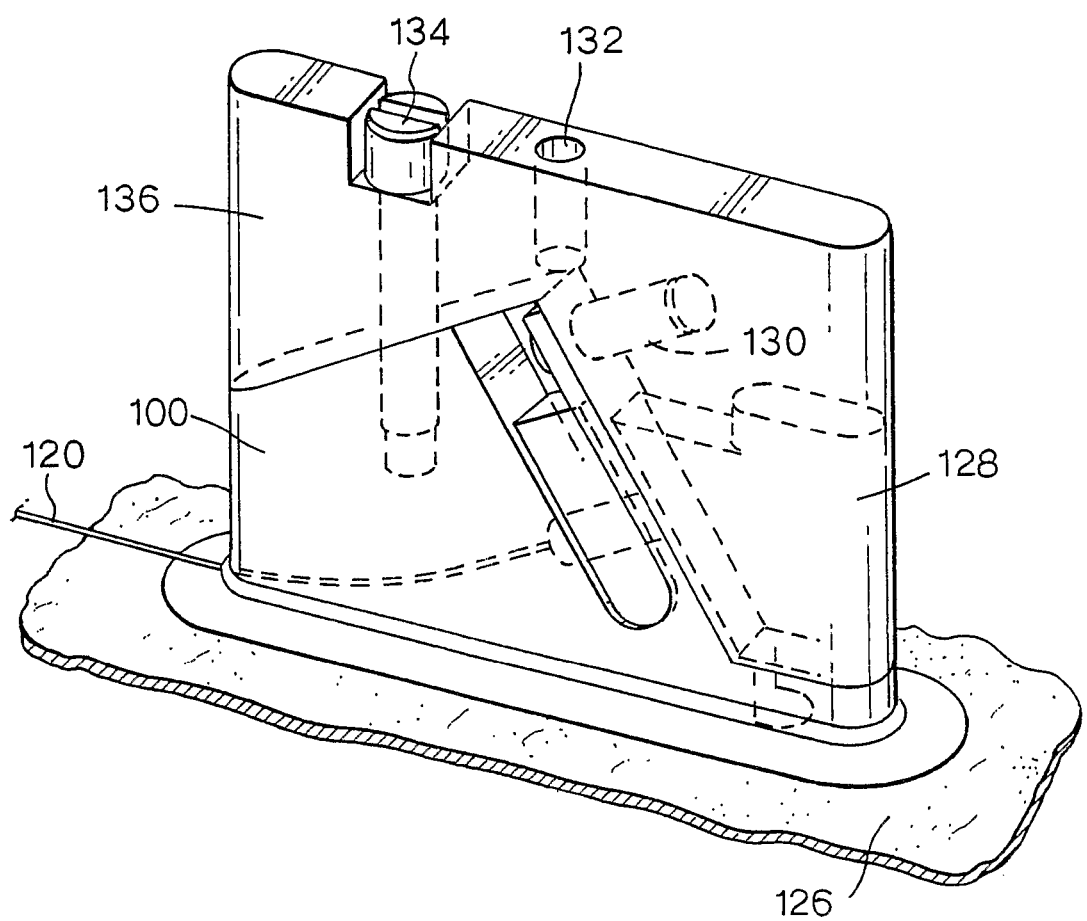
FIG. 3 shows capping of the assembly of FIG. 2 during processing to provide a waveguide assembly according to a second embodiment of the present invention.

FIG. 3 shows capping of the assembly of FIG. 2 during processing to provide a waveguide assembly. The waveguide housing 100 is disposed on a substrate 126. A portion of the waveguide 120 protruding from the base portion 108 of the waveguide housing 100 is also disposed on the substrate 126. A shaped ferrule cap 128 is disposed so as to cover the ferrule 122. A connector recess plug 130 is coupled to the connector recess 114. The ferrule cap 128 and connector recess plug 130 serve to protect the waveguide housing 100 and the ferrule 122 during manufacture of a waveguide assembly.

A protective cover 136 made, for example, of PEEK is placed over the upper portion 106 of the waveguide housing 100, the ferrule cap 128 and the connector recess plug 130. The protective cover 136 is secured to the waveguide housing 100 by a cover attachment screw 134 that passes through the protective cover 136 and attaches to the thread of the capping attachment recess 116. The protective cover additionally comprises one or more consolidation tooling attachment mounting point 132 that includes a screw threaded portion for attaching the protective cover 136 to consolidation tooling.

Figure 4:
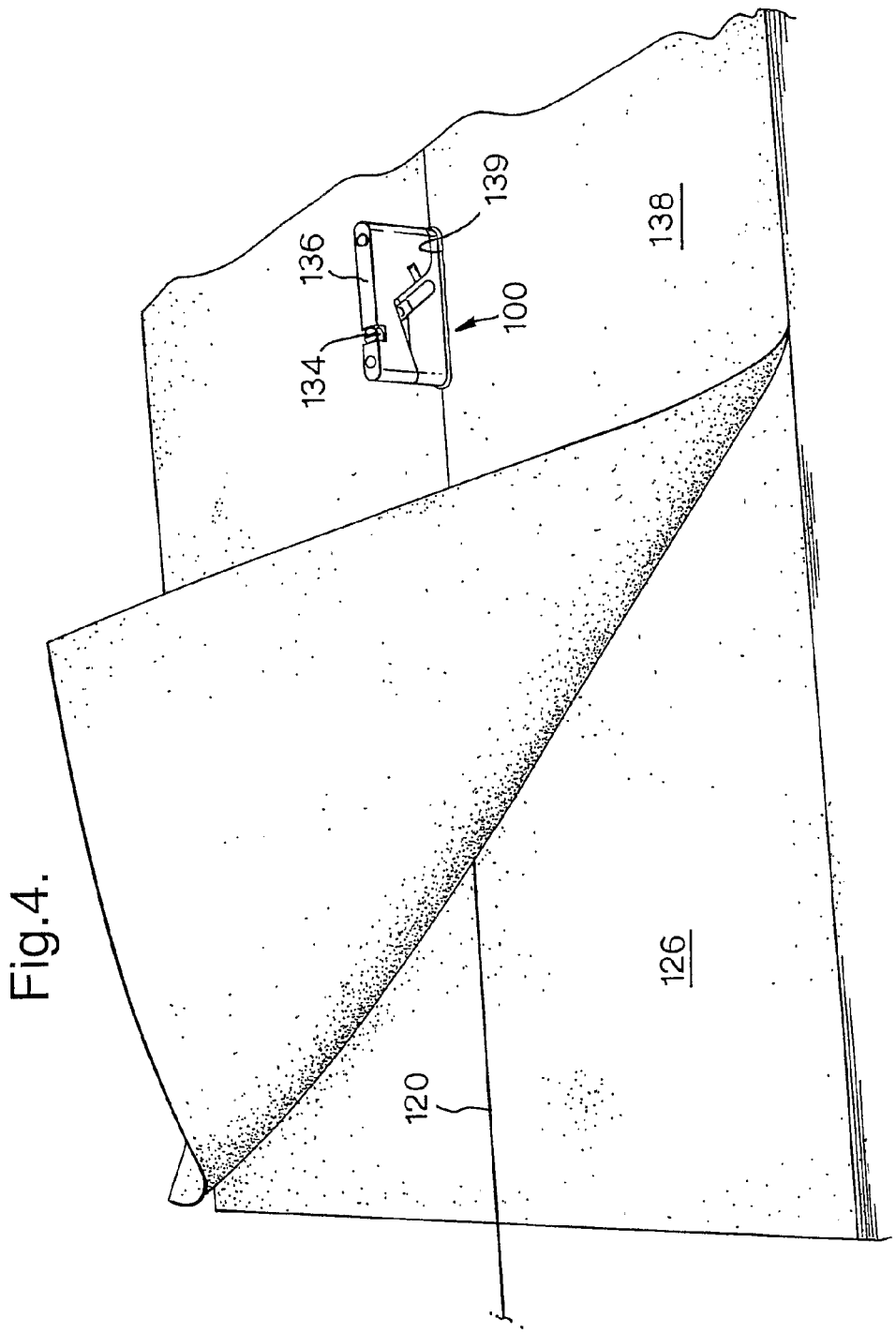
FIG. 4 shows the assembly of FIG. 3 during processing to provide the waveguide assembly according to the second embodiment of the present invention.

FIG. 4 shows the assembly of FIG. 3 during processing to provide a waveguide assembly. One or more embedding layers 138 are disposed about the waveguide housing 100. Each such layer is provided with an excision 139 keyed to allow it to fit snugly about the waveguide housing 100. The excision(s) 139 can be provided by laser-machining (e.g. by using an Excimer laser or a high-pressure water jet) which allows a fairly high degree of precision to be obtained. By providing a snug fit about the waveguide housing 100 using excision(s) 139 in the embedding layer(s) 138, aggregation (or bunching) of excess material about the waveguide housing 100 can be reduced or eliminated.

The substrate 126 and/or embedding layer(s) 138 may consist of one or more composite material layers. Such layers may be formed using layers of material comprising generally aligned fibres of, for example, glass, carbon, metal and/or Kevlar, impregnated or pre-impregnated with a resin material, and combinations of two or more such materials. Various layers may be provided, each having respectively aligned material fibres. The orientation of the material fibres in one layer can be made different with respect to the orientation of material fibres in one or more of the other layer(s). By varying the relative orientations of material fibres between layers, the strength-to-weight ratio of the composite material can be enhanced and/or any anisotropic mechanical properties of the composite material can be controlled.

In the embodiment of FIG. 4, the substrate 126 comprised a stack of fibrous layered composite material pre-impregnated with resin. The embedding layer 138 comprised several layers of the same material (IM7/8552).

Figure 5:
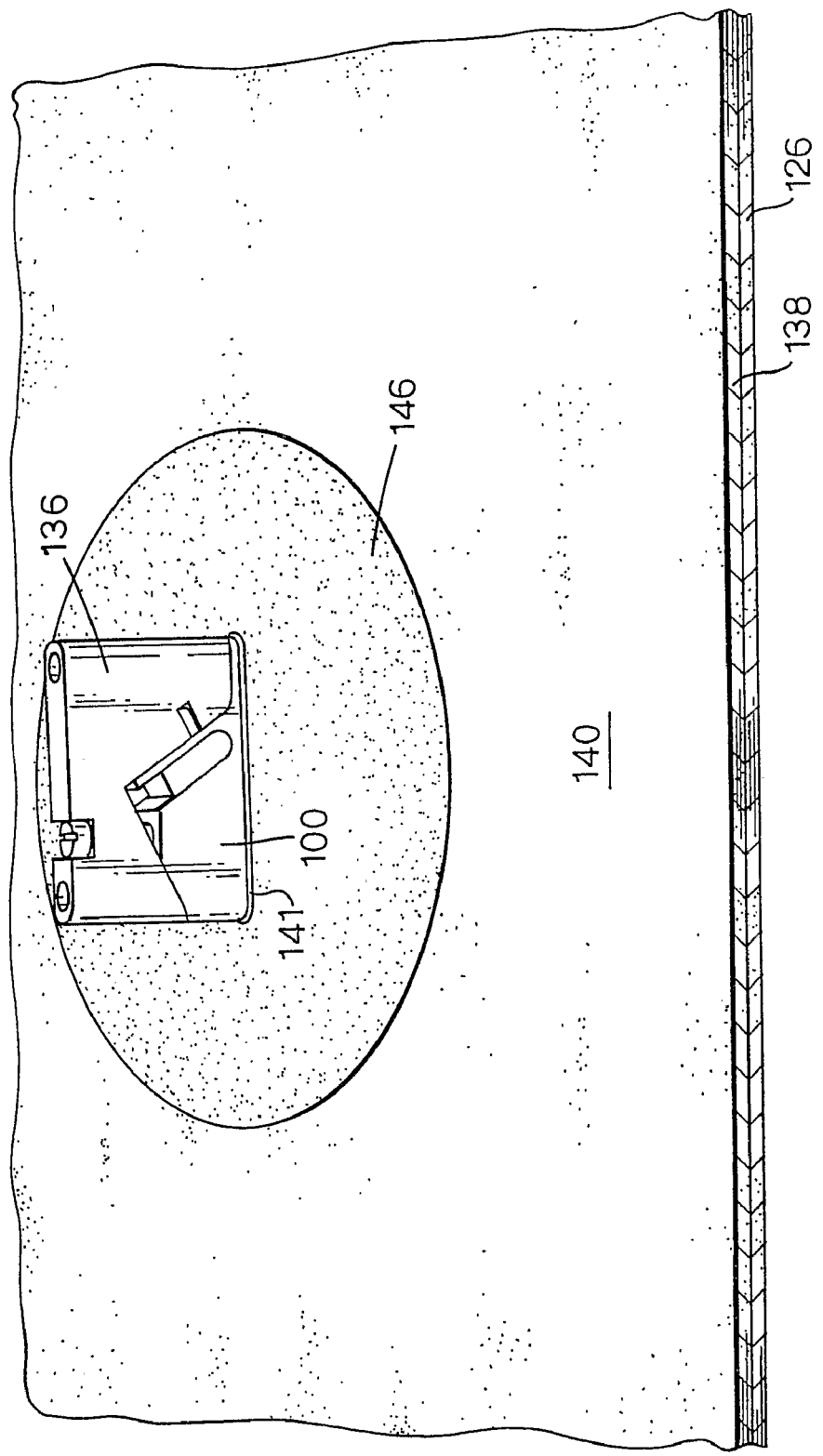
FIG. 5 shows the assembly of FIG. 4 during processing to provide the waveguide assembly according to the second embodiment of the present invention.

FIG. 5 shows the assembly of FIG. 4 during processing to provide a waveguide assembly. Once the embedding layer 138 has been assembled about the waveguide housing 100, a peel ply 140 is applied to the surface of the embedding layer 138. The peel ply 140 is provided to prevent consolidation tooling used to compress the substrate 126 and embedding layer 138 from bonding to the surface of the embedding layer 138.

A rubber connector seal 146 is placed over the peel ply 140 about the waveguide housing 100 and protective cover 136. Connector seal 146 forms part of the consolidation tooling 162 shown in FIG. 6, and comprises a thickened rim 141 that bears against the concave portion 110 of the waveguide housing 100 during the process of curing the composite material layers forming the substrate 126 and the embedding layer 138. The connector seal 146 protects the waveguide housing 100 from resin ingress during the process of curing the composite material layers and also helps to maintain a vacuum used as part of a process to consolidate the composite material layers.

Figure 6:
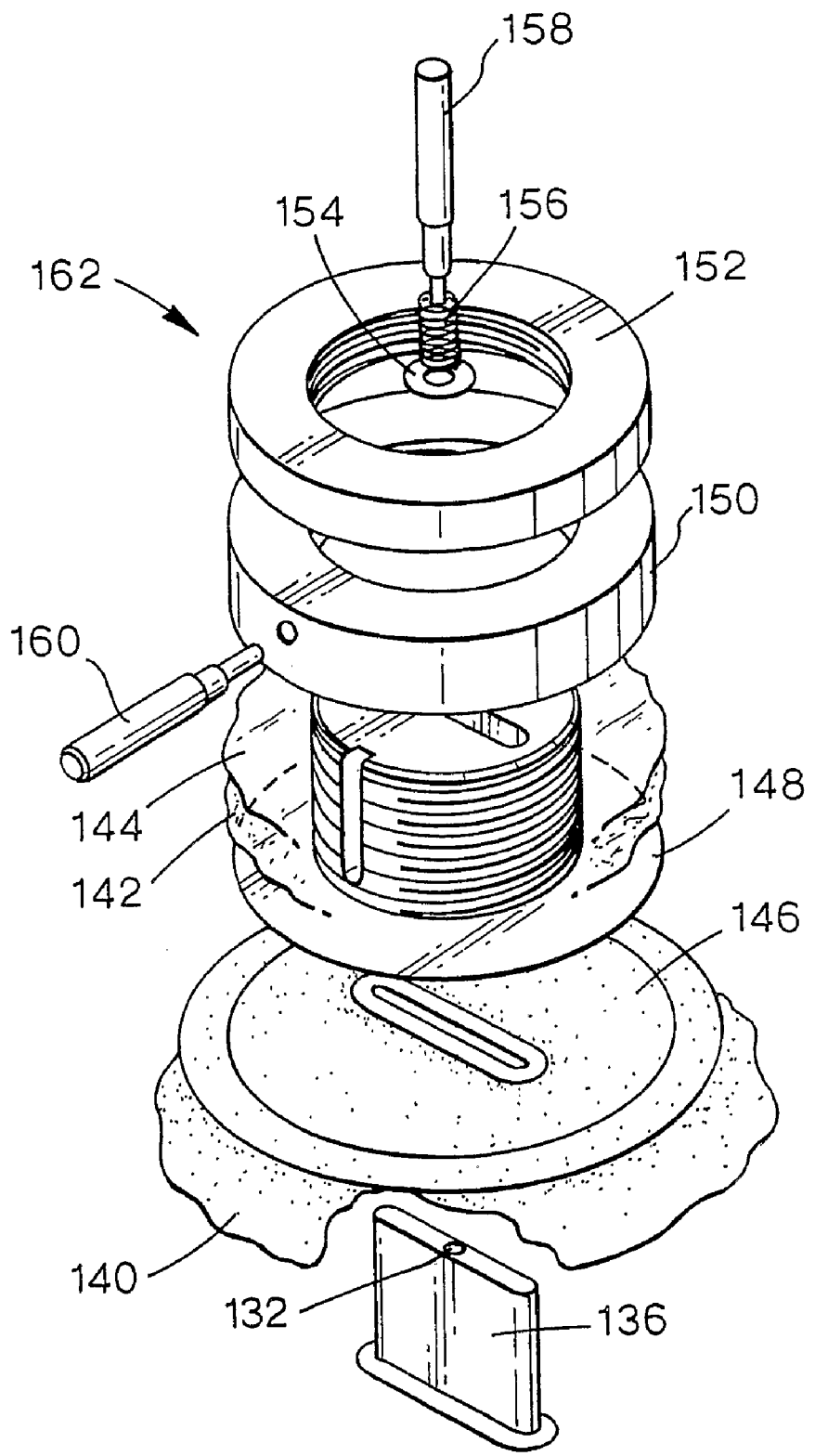
FIG. 6 shows consolidation tooling applied during processing to provide the waveguide assembly according to the second embodiment of the present invention.

FIG. 6 schematically shows consolidation tooling 162 applied during processing to provide a waveguide assembly. As shown in FIG. 5, peel ply 140 and connector seal 146 are placed about the waveguide housing 100 and protective cover 136 over the surface of the embedding layer 138. Consolidation base 148 is placed over the connector seal 146 adjacent the protective cover 136. The consolidation base 148 comprises a bevelled flange-like base and a threaded shaft. It is designed to apply an even pressure to the composite material layers beneath.

A breather cloth 142 is placed about the consolidation base 148 over the surface of the peel ply 140. Vacuum bag 144 is then placed over the breather cloth 142 and about the consolidation base 148. The vacuum bag 144 may comprise a vacuum bag layer that is sealed using vacuum tape about the periphery of the substrate 126. A doweled compression collar 150 attached to a handle 160 is then applied over the consolidation base 148. The doweled compression collar 150 is then forced into engagement with the vacuum bag 144 by tightening a threaded ring 152 on the threaded shaft of the consolidation base 148. This action causes the vacuum bag 144 to provide a vacuum seal in conjunction with the consolidation base 148. Vacuum tape or a rubber washer may be used over the flange of the consolidation base 148 to ensure a good vacuum seal.

A pre-load coupling mechanism is applied to exert a compressional force between the consolidation base 148 and the protective cover 136 in order to consolidate the composite material layers. The pre-load coupling mechanism comprises a pre-load screw 158 having a pre-load spring 156 and a pre-load washer 154. The pre-load spring 156 provides a mechanism for exerting a predetermined force upon the pre-load washer 154. The pre-load washer 154 is used to transfer force applied to the pre-load screw 158 to the upper surface of the consolidation base 148.

The vacuum bag 144 is supported by the breather cloth 142. The breather cloth 142 is separated from the surface over a substantial area by peel ply 140. Curing takes place under reduced pressure and the vacuum bag 144 serves to consolidate material forming the embedding layer. Breather cloth 142 is provided to enable the vacuum bag 144 to assert a substantially even pressure on the embedding layer. Peel ply 140 allows the consolidation tooling 162 to be removed once curing has taken place without becoming bonded to the surface of the embedding layer.

Once the consolidation tooling 162 is firmly in place, the whole waveguide assembly can be cured to set the embedding layer and/or the substrate materials. For example, curing may be achieved by using the techniques herein described.

Figure 7:
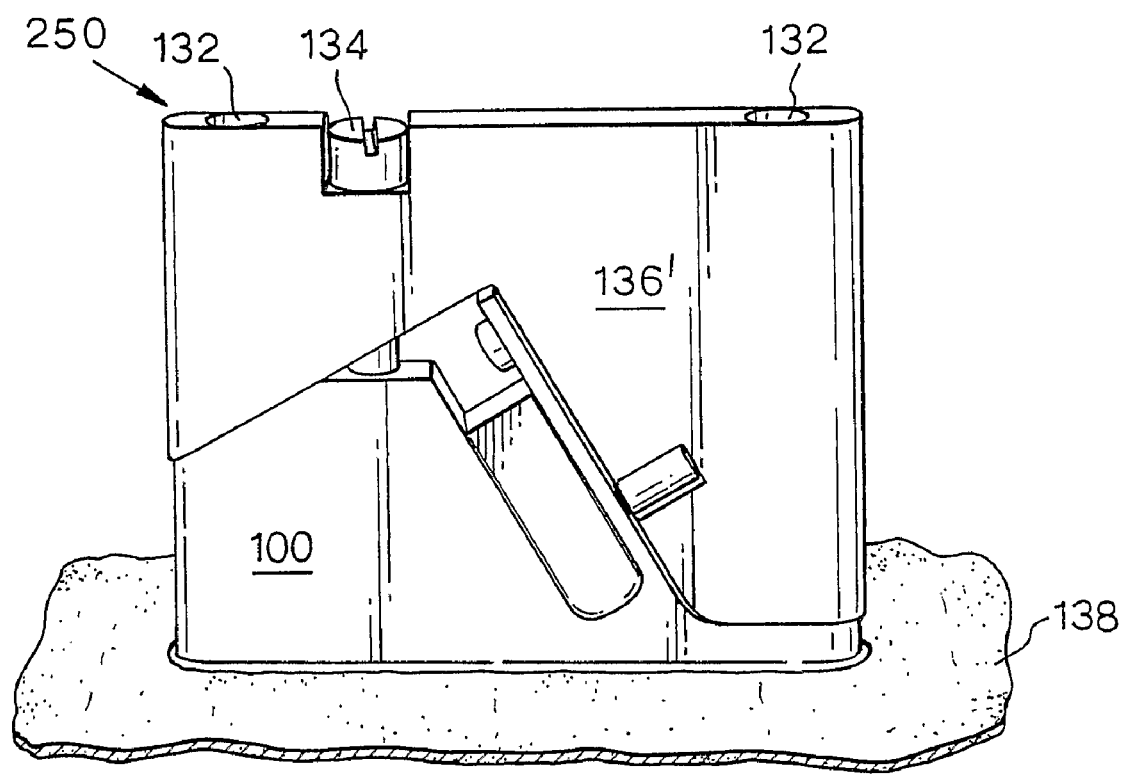
FIG. 7 shows a waveguide connector according to a third embodiment of the present invention.

FIG. 7 shows a waveguide connector 250 attached to protective cover 136' by cover attachment screw 134. The protective cover 136' comprises two consolidation tool mounting points 132, and in this case two respective pre-load coupling mechanisms are applied to exert a compressional force between a consolidation base 148 and the protective cover 136' in order to consolidate the composite material layers. Consolidation of the composite material layers helps prevent formation of voids and thus helps to produce a strong composite material.

In this case the embedding layer 138 comprises a composite material layer including a fibrous material and a resin material. The waveguide connector 250 is shown in FIG. 7 after the resin material has been cured.

As an example of the curing process, where the composite material layer is made using fibrous material that has been pre-impregnated with BMI resin material, the waveguide connector 250 is subject to a temperature of 190° C. for 7 hours at a pressure of 100 psi, before being subject to a post-cure temperature of 245° C. Where standard epoxy resin is used, the waveguide connector 250 is subject to a temperature of 175° C. for 5 hours at a pressure of 90 psi, before being subject to a post-cure temperature of 210° C.

Another technique to make a composite material is to use a resin transfer moulding (RTM) technique. The RTM technique uses fibre pre-form layers that are placed into a closed mould. Resin is injected into the mould at low pressure (<100 psi for thermosetting resin, subsequently cured at a temperature of 175° C. at 70 psi) to fill the voids in the fibre pre-form layers. The mould is then subject to a curing treatment to create the composite material.

Figure 8:
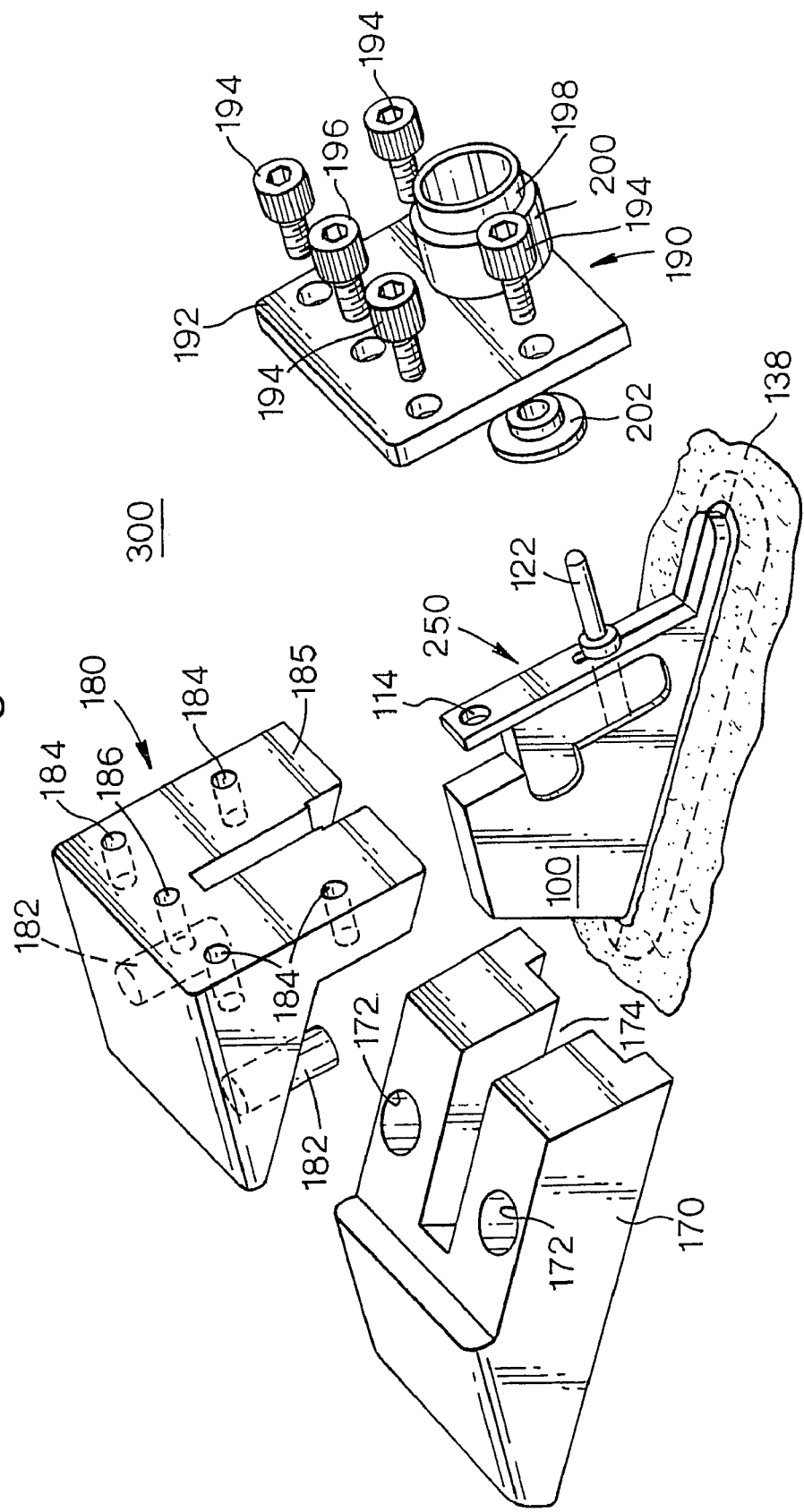
FIG. 8 shows, in exploded view, the waveguide connector of FIG. 7 forming part of a standard type connector.

FIG. 8 shows, in exploded view, the waveguide connector 250 forming part of a standard type connector 300. The standard type connector 300 additionally comprises rear support body 170, front plate assembly support 180 and front plate assembly 190, which may, for example, be manufactured from machined stainless steel. The standard type connector 300 is formed at the surface of the embedding layer 138 and facilitates coupling to a waveguide 120.

The rear support body 170 includes waveguide housing recess 174 which slots about the portion of the waveguide housing 100 that protrudes above the surface of the embedding layer 138. The rear support body 170 is bonded to the surface of embedding layer 138, for example, by using a film adhesive. The rear support body 170 also comprises recesses 172. Front plate assembly support 180 includes lugs 182 that are bonded into the recesses 172 (for example, using Armstrong A661) and thereby inhibit lateral relative movement of the front plate assembly support 180 with respect to the rear support body 170. The front plate assembly support 180 further comprises threaded bolt holes 184 and a central bolt hole 186 provided on an outward face 185.

The front plate assembly 190 is designed to fit to the outward face 185 and thereby to fix the waveguide connector 250, the rear support body 170, the front plate assembly support 180 and front plate assembly 190 so as to provide the standard type connector 300. A rubber seal 202 is placed about the ferrule 122 protruding from the waveguide housing 100. The front plate assembly 190 comprising a front plate 192, inner collar 198 and outer collar 200 is then placed adjacent the outward face 185 of the front plate assembly support 180. The front plate assembly 190 is secured to the front plate assembly support 180 by bolts 194 that pass through the front plate 192 and are attached to the threaded bolt holes 184. The waveguide connector 250 is secured to the front plate by a central bolt 196 that passes though the connector recess 114 formed in the waveguide housing 100 and is attached to the threaded central bolt hole 186 of the front plate assembly support 180.

The ferrule 122 projects through a hole in the front plate 192 and is disposed centrally within the inner collar 198. The inner collar 198, the outer collar 200 and the ferrule 122 together provide the mechanism shown assembled in FIG. 9 for attaching to a standard waveguide connector.

Figure 9:
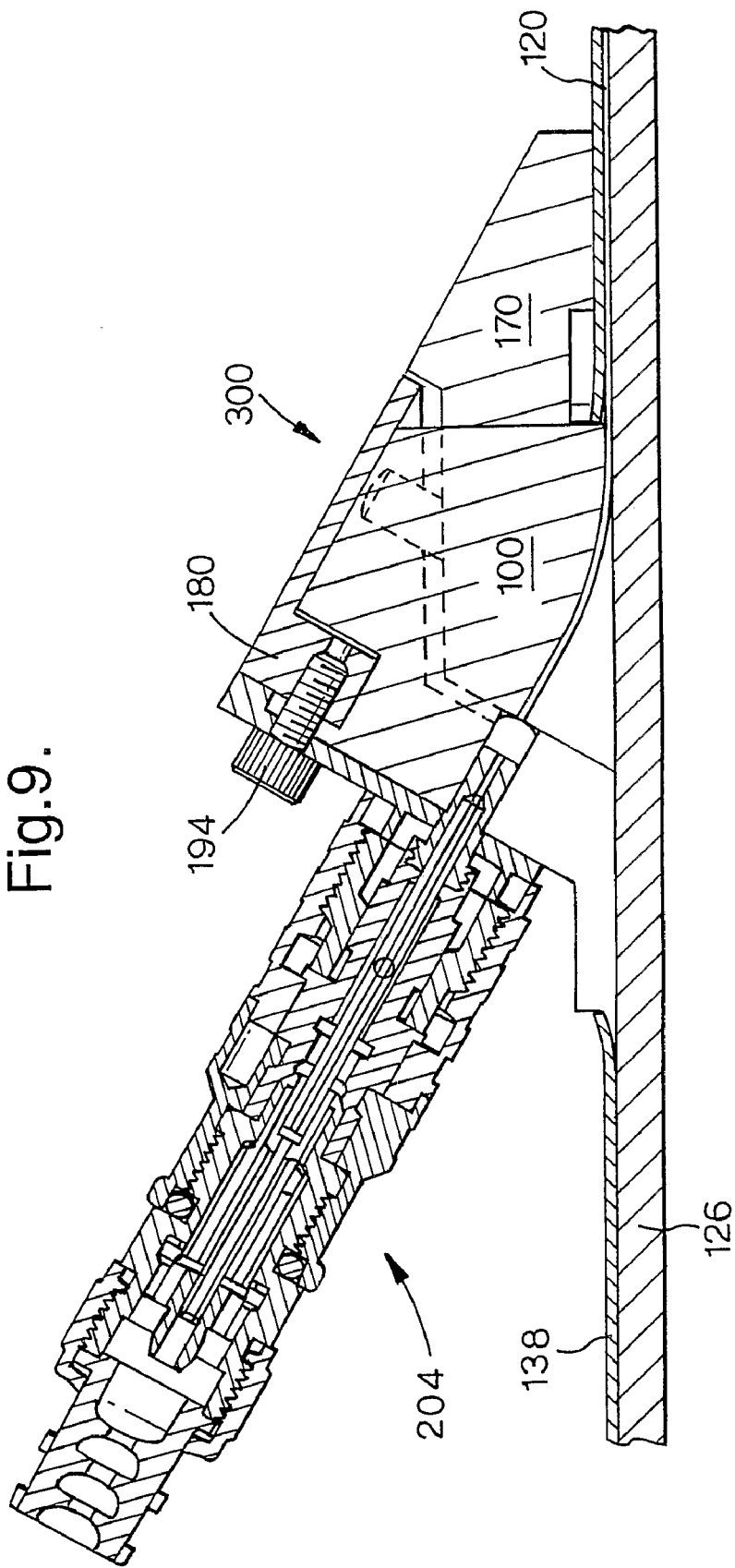
FIG. 9 shows the standard type connector of FIG. 8 coupled to a standard waveguide connector.

FIG. 9 shows the standard type connector 300 coupled to a standard waveguide connector 204. The standard waveguide connector 204 is an MC5 single way connector. FIG. 9 illustrates how the standard type connector 300 is provided on the substrate 126 and provides a channel for guiding the waveguide 120 from the substrate 126 through the embedding layer 138. The waveguide follows a gently curving path, thereby reducing any losses that may otherwise be induced by bending.

Those skilled in the art will realise that the principle of the reciprocity of light ensures that waveguide connectors, assemblies, etc., can be used to couple radiation (such as, for example, optical radiation, infrared radiation etc.) both from and into a waveguide. In the discussions herein, it is understood that this principle of reciprocity applies to all embodiments and aspects of the invention.

Those skilled in the art will realise that the substrate and/or embedding layers may be made from one or more materials, such as, for example, composite materials, metal alloys, metals etc. Additionally, it will be apparent from the disclosure herein that waveguide assemblies according to the present invention may be used to retrofit a waveguide sensing and/or communications system of the type know in the art by providing a waveguide assembly as herein described on an existing substrate, such as, for example, a panel forming part of a vehicle fuselage, component, body or hull.

As described herein, consolidation tooling may be used to ensure that the embedding layer consolidates about the waveguide housing to provide for secure embedding. Those skilled in the art will be aware that such a consolidation process, should it be required as it is not always needed, may be provided by various types of consolidation tooling. Many forms of consolidation tooling are possible, including, for example, use of a heavy weight or various tooling that positively engages a waveguide housing or other embedded element.

Those skilled in the art will also realise that where curing of materials is envisaged, such as, for example, resins used in composite materials, many techniques may be adopted. For example, curing can be implemented by various methods such as chemical, pressure and/or heat induced variations in the physical/chemical composition of a resin either impregnated into fibres or found in layers pre-impregnated with a resin material.

Those skilled in the art will also realise that embodiments of the invention can be incorporated into various standard connectors, such as, for example, MC5, HA, FC, FC/PC etc. connectors. Use of various embodiments of the invention in conjunction with various known connectors can have cost benefits and provides for improved compatibility with existing systems/devices/components that connect to existing embedded waveguide assemblies. Those skilled in the art will also realise that waveguide connectors according to various embodiments of the invention can be used to provide non-standard types of connectors, either by themselves or when used with further components, for coupling a waveguide to various bespoke surface modules.

As is understood by those skilled in the art, the terms "embed," "embedded" and "embedding" in relation to an object and a material relate to at least partially surrounding that object with the material. Those skilled in the art will also understand that waveguides need not be disposed linearly or coplanar with respect to a substrate material. For example, an embedded waveguide may be circularly wound along its length to provide a coiled optical fibre amplifier portion formed within a waveguide assembly. Moreover, those skilled in the art will understand that aligned material fibres of various composite material layers need not be perfectly parallel but may, for example, only be generally aligned in one or more direction within a material layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A waveguide housing for guiding a waveguide from a substrate through an embedding layer, wherein the waveguide housing is formed from a plurality of parts, including a waveguide connector and a front plate assembly which is secured to the waveguide connector, and the waveguide connector comprises an upper portion, a base portion comprising a circumferential lip, and a waveguide channel for guiding the waveguide from the substrate through the embedding layer.

2. The waveguide housing of claim 1, wherein the base portion stabilizes the waveguide connector during a manufacturing process and/or when embedded in the embedding layer.

3. The waveguide housing of claim 2, wherein the embedding layer overlaps at least part of the base portion.

4. The waveguide housing of claim 1, wherein the waveguide housing comprises one or more of a metal/metal alloy, a plastics material, a ceramic material, PEEK and ARCAP.

5. The waveguide housing of claim 1, wherein the waveguide channel comprises a slot which splits the base portion and extends into the upper portion to form a waveguide path.

6. The waveguide housing of claim 1, wherein the base portion comprises a concave portion formed at the junction of the base portion and the upper portion.

7. The waveguide housing of claim 1, wherein the waveguide connector comprises a protective cover which is attached to the waveguide connector to extend over the upper portion during embedding of the waveguide connector.

8. The waveguide housing of claim 1, wherein the waveguide channel provides a curved path for the waveguide.

9. The waveguide housing of claim 1, wherein the waveguide comprises an optical fibre.

10. The waveguide housing of claim 9, wherein the optical fibre is terminated into a ferrule mounted in the waveguide connector.

11. The waveguide housing of claim 1, wherein the substrate comprises one or more of a composite material and a metallic material.

12. The waveguide housing of claim 1, wherein the embedding layer comprises one or more of a composite material and a metallic material.

13. A waveguide assembly, comprising:
a waveguide provided on a substrate;
a waveguide housing formed from a plurality of parts, including a waveguide connector and a front plate assembly which is secured to the waveguide connector, wherein the waveguide connector comprises an upper portion, a base portion comprising a circumferential lip, and a waveguide channel for guiding the waveguide from the substrate through an embedding layer; and
an embedding layer embedding at least part of the base portion.

14. A panel for a vehicle fuselage, component, body or hull, comprising the waveguide assembly of claim 13.

15. A vehicle comprising the panel of claim 14.

16. A method of retrofitting a waveguide sensing and/or communications system to an existing substrate, comprising the steps of:
a) providing a waveguide on an existing substrate;
b) providing a waveguide housing formed from a plurality of parts, including a waveguide connector and a front plate assembly which is secured to the waveguide connector, wherein the waveguide connector comprises an upper portion, a base portion comprising a circumferential lip, and a waveguide channel for guiding a waveguide from a substrate through an embedding layer;
c) providing the waveguide connector which houses a portion of the waveguide proximal to a surface of the existing substrate; and
d) embedding at least part of the base portion in an embedding layer so as to affix at least part of the waveguide and at least part of the base portion to the existing substrate.

17. The method of claim 16, wherein the existing substrate is part of a vehicle fuselage, component, body or hull.

18. A method of manufacturing a waveguide assembly, comprising the steps of:
providing a waveguide housing comprising a plurality of parts, including a waveguide connector and a front plate assembly which is secured to the waveguide connector, wherein the waveguide connector comprises an upper portion, a base portion comprising a circumferential lip, and a waveguide channel for guiding a waveguide from a substrate through an embedding layer;
providing a portion of a waveguide in the waveguide channel;
disposing a further portion of the waveguide on a substrate;
embedding at least part of the base portion in an embedding layer, wherein the waveguide connector guides the waveguide from the substrate through the embedding layer; and
securing the front plate assembly to the waveguide connector.

19. The method of claim 18, further comprising the step of:
capping the waveguide connector prior to embedding in the embedding layer.

20. The method of claim 18, further comprising the step of:
applying consolidation tooling to the waveguide housing to consolidate the embedding layer surrounding the waveguide connector.

21. The method of claim 18, wherein the consolidation tooling comprises a consolidation base for applying a compressional force to the embedding layer and an attachment mechanism for exerting a compressional force between the consolidation base and the waveguide connector, and further comprising the step of:
applying a compressional force between the consolidation base and the waveguide connector.

22. The method of claim 18, wherein the waveguide comprises an optical fibre.

23. The method of claim 22, further comprising the steps of:
terminating the optical fibre into a ferrule; and
disposing the ferrule in the waveguide connector.

24. The method of claim 18, wherein the embedding layer comprises a composite material.

25. The method of claim 18, wherein the embedding step comprises curing of a resin material.

26. The method of claim 18, further comprising the step of:
incorporating the substrate, as a panel, into a vehicle fuselage, component, body or hull.

* * * * *